July 31, 1923.
E. R. EVANS
BRAKE
Filed Dec. 16, 1922
1,463,159
2 Sheets-Sheet 1
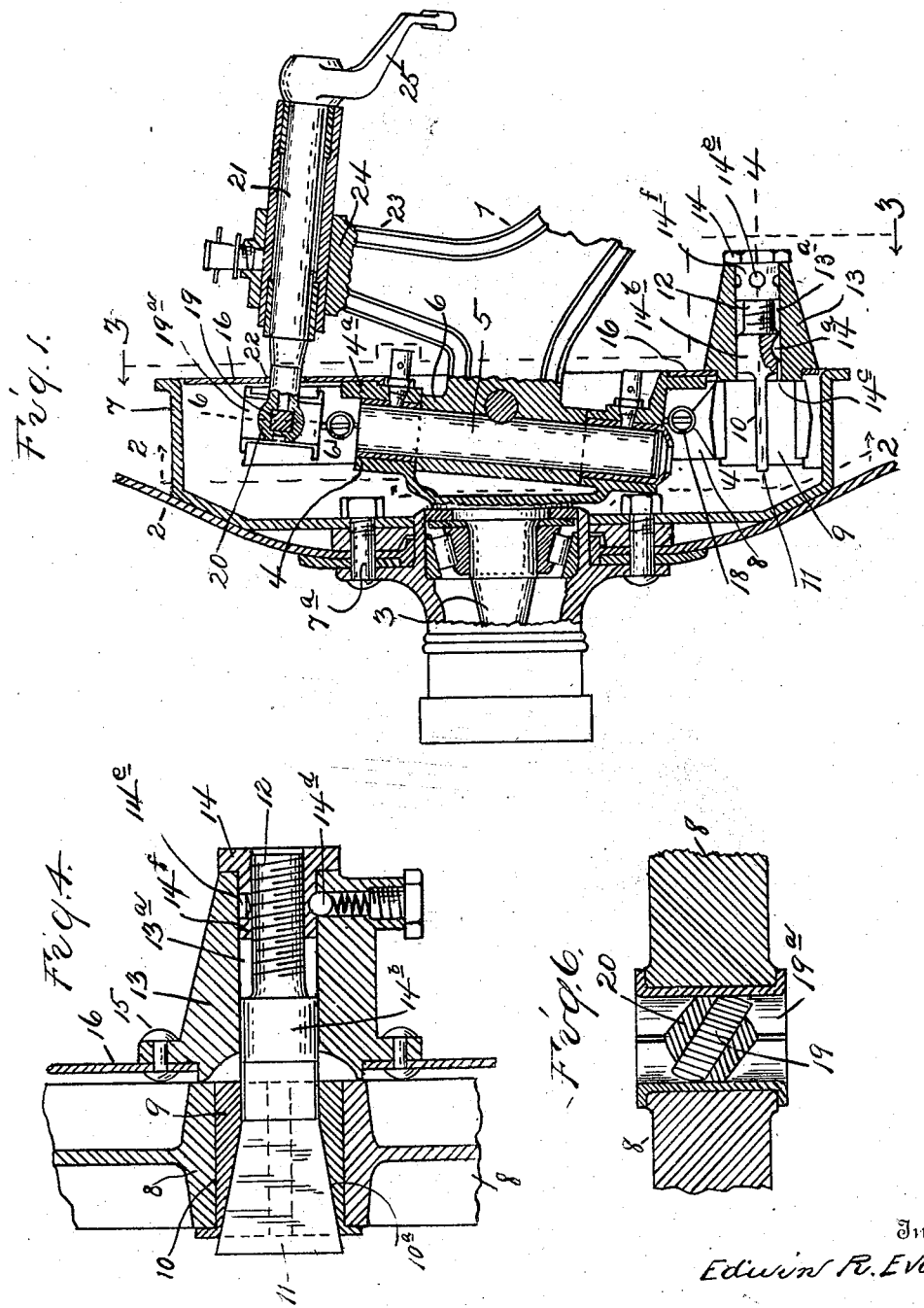

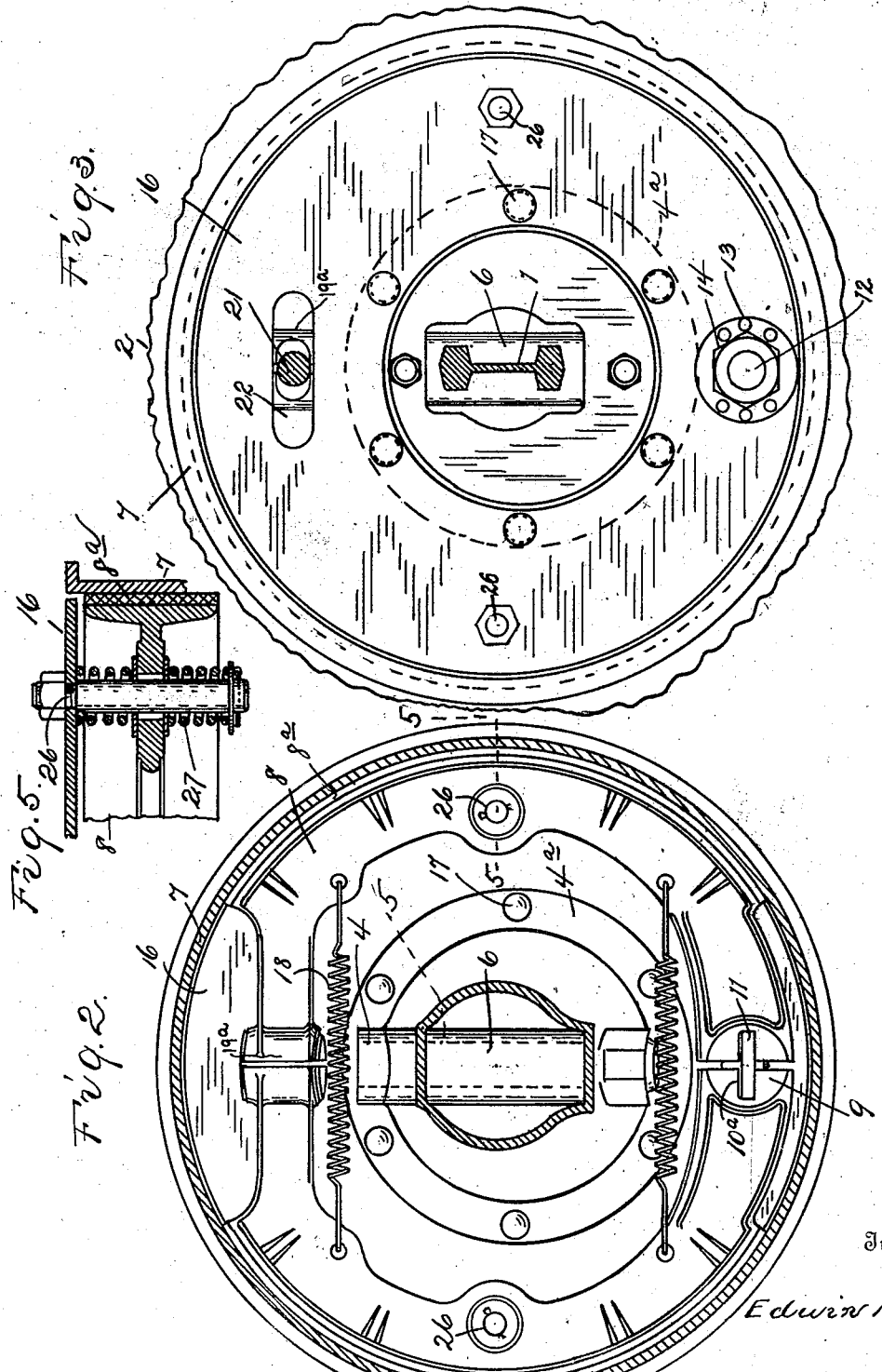

Patented July 31, 1923.

1,463,159

UNITED STATES PATENT OFFICE.

EDWIN R. EVANS, OF DETROIT, MICHIGAN.

BRAKE.

Application filed December 16, 1922. Serial No. 607,341.

*To all whom it may concern:*

Be it known that I, EDWIN R. EVANS, a citizen of the United States of America, residing at Detroit, in the county of Wayne and State of Michigan, have invented certain new and useful Improvements in Brakes, of which the following is a specification, reference being had therein to the accompanying drawings.

This invention relates to steering wheel brakes for motor vehicles.

Features of the invention are the employment of a cam arranged to act upon a complementary pair of brake shoes, and self adjusting to equalize the forces which it exercises upon said shoes; utilization of the cam to restrain the shoes from lateral shifting; provision of means for accurately taking up wear between the shoes and drum; and springs acting upon the brake shoes to exercise an anti-rattle effect.

In the drawings:—

Figure 1 is a diametrical sectional view of a wheel equipped with the improved brake, the mounting of said wheel upon its axle being also disclosed;

Figure 2 is a sectional view on line 2—2 of Figure 1 showing primarily the mounting of the brake shoes;

Figure 3 is a sectional view taken on a plane parallel to that of Figure 2 on line 3—3 of Figure 1 but looking toward the wheel;

Figure 4 is a sectional detail on line 4—4 of Figure 1 showing the adjustment means whereby compensation may be made for wear upon the brake shoes;

Figure 5 is a section on line 5—5 of Figure 2 showing a provision for preventing rattle of the brake shoes;

Figure 6 is a cross-section on line 6—6 of Figure 1 showing the engagement of an actuating cam with the brake shoes.

In these views the reference character 1 designates the front axle of a vehicle and 2 one of the wheels upon said axle. For steering purposes it is the general practice to swivel the steering wheels upon the axle. Thus the wheel 2 is journaled upon a spindle 3 having a pair of integral spaced bearings 4 respectively above and below the spindle axis for receiving the end portions of a pin 5 which establishes the desired swivel steering axis through engagement with a bearing 6 integral with the axle, between the bearings 4. $4^a$ is a circular plate integral with the bearings 4. 7 is a brake drum secured by bolts $7^a$ or some other suitable means to the interior face of the wheel 2 in the usual concentric relation to said wheel, and 8 designates a pair of complementary brake shoes arranged within said drum, one at each side of the vertical axis thereof, and provided with the customary linings $8^a$ for frictional engagement with the drum, said brake shoes together forming an annulus of a substantially T-shaped cross section, as best seen in Figure 5. 9 is a two-part cylindrical pivot member for the two brake shoes arranged between the lower ends thereof and engaging complementary semi-cylindrical seats 10 formed in said ends, the axis of said pivot member being parallel to that of the wheel. The adjoining faces of the pivot elements 9 are formed with opposite grooves $10^a$ to embrace a wedge-shaped adjusting head 11, the bottoms of said grooves being divergently inclined in parallelism with the divergent edge faces of said head. 12 is a stud-bolt projecting from the smaller end of the head 11 in coaxial alignment with the pivot member 9, and preferably integral with said head. Said pivot member is provided with a support 13 and is axially adjustable with respect to said support for the purpose of adjusting the brake shoes to take up wear. Thus the stud-bolt 12 is extended freely through a bore $13^a$ in the support 13 and a nut 14 terminally engaging said bolt bears upon said support. By tightening said nut against the support, the bolt 12 and adjusting head 11 may be shifted axially of the pivot 9 so as to exercise a wedge action upon the complementary parts of said pivot, thus adjusting the pivotal extremities of the brake shoes to increase their spaced relation. It is necessary to restrain the pivot member 9 and adjusting head 11 from such accidental turning as might shift the latter from its transverse relation to the brake shoe ends. This restraint is exercised by a key $14^a$ carried by a cylindrical guide $14^b$ formed integral with the head 11 and bolt 12 between the same, said key engaging a spline way $14^c$ in the member 13. For holding the nut 14 positively in adjustment, a spring-pressed ball detent $14^d$ is selectively engageable with any of an annular series of depressions 14ᵉ formed in a sleeve 14ᶠ integral with said nut. The support 13 is rigidly mounted by rivets 15 upon an annular sheet metal plate 16 secured by rivets 17 to the periphery of the plate 4ᵃ. Thus it is evident that said plate 16 and the pivot support for the brake shoes are carried by the swivelled spindle-supporting plate 4ᵃ so as to maintain a constant relation with the brake drum in any position of steering adjustment of the wheel. Above and below the axis of the wheel, the two brake shoes 8 are connected by coiled springs 18 and are urged thereby toward each other about the pivot 9, so as to normally clear the brake drum.

The means for applying the brakes comprises a cam 19 located within a vertically cylindrical liner pocket 19ᵃ journaled in the opposed upper extremities of the brake shoes. Said cam is elongated between the opposed end faces of the brake shoes, in an oblique relation to said faces, and is of square (or other polygonal) cross section with respect to its longitudinal axis, the cam extremities being spherically rounded. Said cam is freely longitudinally slidable in a head 20 occupying the pocket 19ᵃ and carried, preferably integrally, by a rock-shaft 21 transverse to the major axis of the cam and passing through a slot 22 in the plate 16. 23 is a standard integral with the axle 1 adjacent the brake drum and forming at its upper end a bearing 24 in which the rock-shaft 21 is journaled. Said rock-shaft is extended beyond the bearing 24 to carry an arm 25 for engagement by a brake control rod (not shown). It is an important feature of the construction that the cam 19 is centered in alignment with the axis of the pin 5 about which the wheel has its steering movement.

As a provision against rattling of the brake shoes it is preferred to loosely engage each shoe, at a point substantially midway between its ends, by a bolt 26 rigidly secured to the plate 16, a pair of coiled springs 27 being mounted upon each of said bolts, one at each side of the corresponding brake shoe, said springs being under a sufficient stress to resist vibration of the brake shoes.

In the operation of the described invention, normally the brake shoes are held clear of the brake drum by the springs 18. To apply the brakes the shaft 21 is rocked in a direction to reduce obliquity of the cam 19 to the engaged end faces of the brake shoes, thereby forcing the brake shoes apart to an extent proportionate to the angular actuation of said shaft. Since the cam 19 is centered in alignment with the axis of the pin 5, about which the wheel has its steering movement, the operative relation of the cam to the brake shoes is not effected by any steering adjustment to which the wheel may be subjected. The spherical form of the extremities and the cylindrical shape of the pocket 19ᵃ together permit a free turning of the wheel for steering purposes without any obstruction arising from said cam. Engagement of the head 20 in the cylindrical pocket 19ᵃ of the brake shoes maintains the latter centered at their upper ends with respect to the brake drum and prevents lateral play of said ends. Since the work arm established by the cam 19 is of quite short radius, as compared to the power arm established at 25, it is evident that the mechanism is such as to secure a very powerful braking force with a comparatively slight manual effort.

When braking of a vehicle is effected by application of a restraining force to a plurality of the vehicle wheels it is highly desirable to equalize the force applied to the several wheels. In case the linings of any of the brake shoes wear unequally there is a resultant tendency to unequalized response to the braking effort. The present invention provides for a very accurate adjustment of the brake shoes to insure equalization of the braking forces applied to the several wheels. Thus, by turning the nut 14 the pivotal extremities of the brake shoes may be spaced apart to a very closely regulable degree, the adjustment being rigidly maintained by said nut. Since the brake shoes are more or less responsive to actuation of the cam 19, according as the spaced relation of the lower ends of the brake shoes is increased or diminished, it is evident that the described adjustment means provides for accurate compensation for wear of the brake linings (or drums) and equalization of braking forces when a plurality of wheels are under a common braking control.

The sliding mounting of the cam 19 in the head 20 is of advantage in that said cam is thus made self-adjusting to effect equalization of the thrust transmitted through said cam to the respective brake shoes, when the shaft 21 is rocked.

What I claim as my invention is:—

1. In a brake mechanism, the combination with a vehicle wheel, and a brake drum carried by said wheel, of a journal member for said wheel, a mounting for said journal member adapting the same for a steering movement about a swivel axis substantially transverse to that of the journal member, a pair of complementary brake shoes co-acting interiorly with said drum and pivoted at one end, the other ends of said brake shoes being formed with substantially radial channels arcuate with respect to said swivel axis, a rock shaft substantially transverse to said swivel axis, a cam upon said shaft engaging said channelled ends of the brake shoes, said cam being centered in substantial alignment with said swivel axis and being elongated transversely of said shaft, the brake-shoe engaging faces of the cam being curved to conform with the curvature of the channeled faces of the shoes, and means for rocking said shaft.

2. In a brake mechanism, the combination with a vehicle wheel, and a brake drum carried by said wheel, of a journal member for said wheel, a mounting for said journal member adapting the same for a steering movement about a swivel axis substantially transverse to that of the journal member, a pair of complementary brake shoes interiorly coacting with said drum, a pivotal mounting for corresponding extremities of said brake shoes, the other extremities of said shoes being formed with complementary substantially semi-cylindrical radial channels, a rock shaft substantially transverse to said swivel axis, a cam upon said shaft engaging in said channels of the brake shoes, said cam being centered in substantial alignment with said swivel axis and being elongated transversely of said shaft the ends of said cam established by said axis being spherically rounded, and means for rocking said cam upon an axis transverse to its major axis.

3. In a brake mechanism, a brake drum, a pair of complementary brake shoes pivoted within said drum at corresponding extremities, the other extremities of said shoes being formed with complementary substantially semi-cylindrical channels transverse to the axis of the brake drum, and a cam engaging in said channels for spreading said brake shoes, restraining the latter from lateral play through its location in said channels.

4. In a brake mechanism, the combination with a brake drum, of a pair of complementary brake shoes interiorly engageable with said drum, a pivot mounting for said brake shoes, a two part pivot member, the parts thereof having opposing relatively inclined channels, a wedge member engaging the channels of the pivot parts, and a shank carried by said wedge member slidably engaging said pivot mounting and held from rotation thereon, said shank having a threaded portion, and a nut upon said threaded portion bearing upon said pivot mounting for axially shifting the wedge member to spread the pivot parts and the pivotal ends of the brake shoes.

5. In a brake mechanism, the combination with a brake drum, of a pair of complementary brake shoes interiorly engageable with said drum, a two-part pivot member engaging between corresponding ends of said shoes, a flat wedge member engaging between said pivot forming members, for said pivot members being carried by said wedge member, and means for adjusting said wedge member axially of the pivot to spread the parts of the latter and the pivotal ends of the shoes.

6. In a brake mechanism, a brake shoe having a pocket opening in an end face thereof transverse to the axis of the brake shoe, and a cam for actuating said shoe restraining the shoe from lateral movement by engagement in said pocket.

7. In a brake mechanism, a pair of brake shoes having adjoining ends jointly forming a pocket with an opening therein extending transverse to the axis of the brake shoe, and a cam member acting upon said ends for actuating said shoes and restraining the shoes from lateral movement by engagement in said pocket.

8. The combination with a wheel for motor vehicles and the like, of a steering pivot for said wheel substantially transverse to the axis of the wheel, braking members for retarding the movement of said wheel about its axis, means for actuating said braking members, and means for equalizing the action of said braking members permitting the normal turning movement of said wheel about its steering pivot.

9. The combination with a wheel for motor vehicles and the like, of a steering pivot for said wheel substantially transverse to the axis of the wheel, braking members for retarding the movement of said wheel about its axis, means for actuating said braking members, and a common means for equalizing the action of said braking members and compensating for changes in the position of the ends of the braking members produced upon the turning movement of said wheel about its steering pivot.

10. The combination with a wheel for motor vehicles and the like, of a steering pivot for said wheel substantially transverse to the axis of the wheel, braking members for retarding the movement of said wheel about its axis, means for actuating said braking members, and means for equalizing the action of said braking members permitting the normal turning movement of said wheel about its steering pivot, said braking members having a liner interposed between the ends of the braking members and the equalizing means.

11. The combination with a wheel for motor vehicles and the like, of a steering pivot for said wheel substantially transverse to the axis of the wheel, braking members for retarding the movement of said wheel about its axis, means for actuating said braking members, and means for equalizing the action of said braking members permitting the normal turning movement of said wheel about its steering pivot, said braking members having a combined liner and retaining means for the equalizing means interposed between the ends of the braking members and the equalizing means.

12. The combination with a wheel for motor vehicles and the like, of a steering pivot for said wheel substantially transverse to the axis of the wheel, braking members for retarding the movement of said wheel about its axis, means for actuating said braking members, and means for equalizing the action of said braking members permitting the normal turning movement of said wheel about its steering pivot, said braking members having a liner interposed between the ends of the braking members and the equalizing means, said liner having retaining flanges on its opposite ends.

13. In a brake mechanism, the combination with a brake drum, of a pair of complementary drum shoes interiorly engageable with said drum, a two-part pivot member engaging between corresponding ends of said shoes, a stationary support, a wedge carried by said stationary support and forming a support for said two-part pivot member, means on said support for holding said wedge from revolving, and an adjustment member for longitudinally moving said wedge to separate the pivotal ends of the shoes.

14. The combination with a wheel for motor vehicles and the like, of a steering pivot for said wheel substantially transverse to the axis of the wheel, braking members for retarding the movement of said wheel about its axis, means for actuating said braking members, and an equalizing member for equalizing the action of said braking members, said equalizing member and steering pivot being in substantial alignment in the different positions of turning movement of the wheel about its steering pivot.

15. The combination with a wheel for motor vehicles and the like, of a steering pivot for said wheel substantially transverse to the axis of the wheel, braking members for retarding the movement of said wheel about its axis, means for actuating said braking members, and means for equalizing the action of said braking members, said means comprising a cam slidably mounted and having its ends constructed to permit of movement of the wheel about its steering pivot.

In testimony whereof I affix my signature.

EDWIN R. EVANS